United States Patent [19]

Bubik et al.

[11] Patent Number: 5,098,509

[45] Date of Patent: Mar. 24, 1992

[54] TIRE ENVELOPE SEALING DEVICE

[76] Inventors: Leslie Bubik, 421 Roselawn Avenue, Toronto, Canada, M5N 1J9; R. James Dornan, 97 River Grove Drive, Scarborough, Ontario, Canada, M1W 3T8

[21] Appl. No.: 699,194

[22] Filed: May 13, 1991

[51] Int. Cl.$^5$ .................................. B29C 35/02
[52] U.S. Cl. ........................... 156/394.1; 156/96; 156/909; 425/14; 425/28.1; 425/58
[58] Field of Search ................. 425/28.1, 32, 14; 156/96, 909, 394.1, 398

[56] References Cited

U.S. PATENT DOCUMENTS

| | | | |
|---|---|---|---|
| 2,966,936 | 1/1961 | Schelkmann | 156/96 |
| 3,236,709 | 2/1966 | Carver | 264/313 |
| 3,616,058 | 10/1971 | Fuller | 156/398 |
| 3,802,978 | 4/1974 | Barnett | 156/96 |
| 3,884,740 | 5/1975 | Schelkmann | 156/96 |
| 3,895,985 | 7/1975 | Schelkmann | 156/96 |
| 3,966,535 | 6/1976 | Abularach | 156/96 |
| 4,129,474 | 12/1978 | Martin | 156/96 |
| 4,175,991 | 11/1979 | Harrelson | 156/96 |
| 4,274,897 | 7/1979 | Barefoot | 156/96 |
| 4,299,647 | 11/1981 | De Haven | 156/96 |
| 4,309,234 | 1/1982 | Witherspoon | 156/96 |
| 4,600,467 | 7/1986 | Perdue | 425/14 |
| 4,624,732 | 11/1986 | King | 156/909 |
| 4,634,357 | 1/1987 | Brewer et al. | 425/36 |
| 4,808,256 | 2/1989 | Hill | 156/394.1 |
| 4,861,247 | 8/1989 | Shimek | 425/17 |
| 4,966,640 | 10/1990 | Hill | 156/394.1 |

Primary Examiner—Willard E. Hoag
Attorney, Agent, or Firm—Niro, Scavone, Haller & Niro

[57] ABSTRACT

An expandable annular envelope sealing device for manually sealing a curing envelope between an outer annular portion and the bead of a tire to be retreaded in an autoclave. This envelope sealing device includes two opposed, expandable semicircular half-rings and either a toggle-actuated sealing lever or, preferably, a turnbuckle sealing lever for fine tuning adjustment of the expansion of the half-rings.

21 Claims, 3 Drawing Sheets

Fig. 3
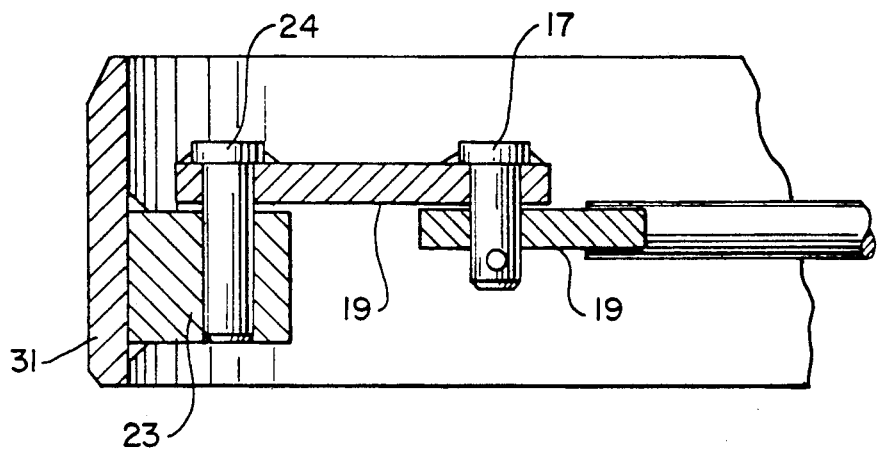
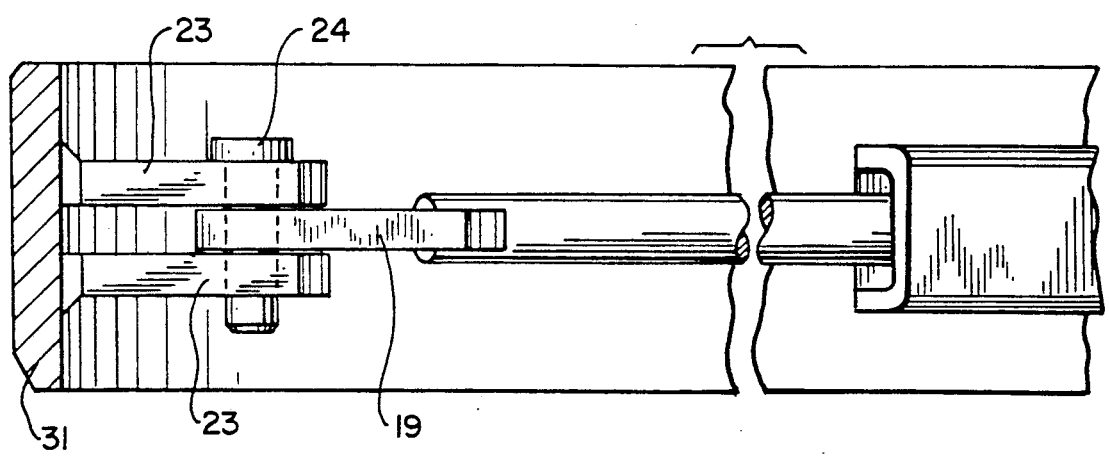
Fig. 4

TIRE ENVELOPE SEALING DEVICE

BACKGROUND OF THE INVENTION

The present invention relates generally to an apparatus useful in the curing of retreaded tires exposed to elevated temperatures and pressures. More specifically, the present invention relates to an apparatus used to seal a conventional curing envelope to a tire casing to prevent deterioration of the retread covered by the envelope during the retread curing process.

It is well known to cure retreaded tires under elevated temperatures and pressures which occur in a tire autoclave. However, the superheated steam environment of the autoclave must not access the area of the tire to be retreaded. Thus the prior art discloses various devices used to seal an elastomeric protective envelope over the retread area of the tire, typically between a mechanical structure and the sidewall or side surface of the tire casing. Examples of such sealing systems used in retreading systems are described in detail in U.S. Pat. Nos. 2,966,936, 3,236,709, 3,802,978, 3,884,740, 3,895,985, 3,966,535, 4,129,474, 4,175,991, 4,242,169, 4,274,897 and 4,309,234.

It is also known in the art to seal the curing envelope by radially expanding a unitary ring which abuts the bead surface of the tire to be retreaded. In such devices the diameter of the ring, when in its unexpanded position, is slightly smaller than the diameter of the bead of the tire, allowing the ring to be easily placed within the tire casing; when the ring is expanded, the curing envelope is sealed between the outer surface of the ring and the bead of the tire. See, for example, U.S. Pat. Nos. 4,861,247 to Schimanek and 4,634,357 to Brewer, which are hereby incorporated by reference.

However, these prior art devices are difficult to adjust once they have been positioned, and do not provide effective ring expansion. For example, the use of a single ring having overlapping end portions tends to form a "C" shape when expanded, and thus cannot provide the circumferentially uniform seal which an expandable ring capable of maintaining a circular or nearly circular shape would provide against the bead or rim of a tire. Moreover, the prior art suggests the use of a relatively large spacing between the portions of the locking mechanism which operate to expand the ring.

SUMMARY OF THE PRESENT INVENTION

The present invention preserves the advantages of prior art envelope sealing devices. In addition, it provides new advantages not found in currently available envelope sealing devices, and overcomes many of the disadvantages of such currently available devices.

The invention is generally directed to an envelope sealing device that includes two opposed and expandable semicircular half-rings, toggle means with pivotally connected link members connected to both ends of each semicircular half-ring for expanding the half-rings, and diametrically extending adjusting means for actuating the toggle means. The invention addresses the need to seal a conventional curing envelope to the bead of a tire casing, while retaining a nearly circular shape for the expanding half-rings and thus providing a better seal. The invention also addresses the need to allow fine tuning adjustment of the expansion of the half-rings. Further, the invention addresses the need to provide a manually actuable device which directly transmits the force exerted on a lever to the half-rings in a substantially circumferential direction along the half-rings, and at a plurality of spaced locations proximate the ends of each of the half-rings.

In one embodiment, the adjusting means includes an intermediate threaded turnbuckle and extensible and retractable threaded connecting members. The proximal ends of the threaded connecting members mate with the threaded turnbuckle, and the distal ends of the threaded connecting members cooperate with the link members of the toggle means. The adjusting means are manually actuable and the toggle means are adapted to transmit the forces required for expanding the half-rings while retaining a nearly circular shape of the half-rings.

In a second embodiment, the adjusting means includes a second toggle means which is also manually actuable. The second toggle means transmits a force to the first toggle means for expanding the half-rings while retaining a nearly circular shape of the half-rings.

An additional feature of each of the two preferred embodiments is the positioning of the toggle means. Pairs of toggle means are simultaneously actuated by a single adjusting means adapted to provide substantially circumferentially directed forces on the half-rings. The link members of the toggle means are pivotally connected at or near the ends of each of the half-rings, such that the link members are nearly perpendicular to the longitudinal axis of the diametrically opposed adjusting members.

The link members are also preferably spaced from the periphery of the half-rings, by means of a radially inwardly projecting spacing member rigidly connected at the ends of the half-rings. This feature allows a relatively large diametric extension of the adjusting means to be converted into a relatively small displacement or expansion of the half-rings, allowing "fine tuning" of the ring expansion.

A still further aspect of the present invention is the use of pairs of curved bridging plates positioned at the ends of each of the half-rings, for accepting normally oriented secondary forces applied along the longitudinal axes of the adjusting member and displacing in a direction that allows a more nearly circular expansion of the half-rings.

Accordingly, an object of the present invention is to provide an envelope sealing device which allows its annular portion to be easily and manually expandable in the radial direction for sealing a curing envelope between the annular portion of the device and the rim of a tire to be retreaded in an autoclave.

An additional object of the present invention is to provide adjusting means on the envelope sealing device for transmitting the forces necessary to easily and manually expand the annular portion of the device, and for providing fine tuning adjustment of the expansion, for tires of various bead diameters.

Another object of the present invention is to provide an envelope sealing device whose outer annular portion includes two opposed semi-circular half-rings and which retains its circular shape in its fully expanded state.

A further object of the present invention is to provide alternate adjusting means for manually expanding the annular portion of the envelope sealing device, utilizing either a toggle assembly or a turnbuckle.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a side view of a portion of FIG. 2 taken along section line 3—3, which runs along a portion of one of the connecting members and then along a link member and a spacing member.

FIG. 4 is a side cross-sectional view of FIG. 2 taken along section line 4—4, showing a link member's connection to a spacing member.

DETAILED DESCRIPTION OF THE PREFERRED EMBODIMENTS

Figure 1:
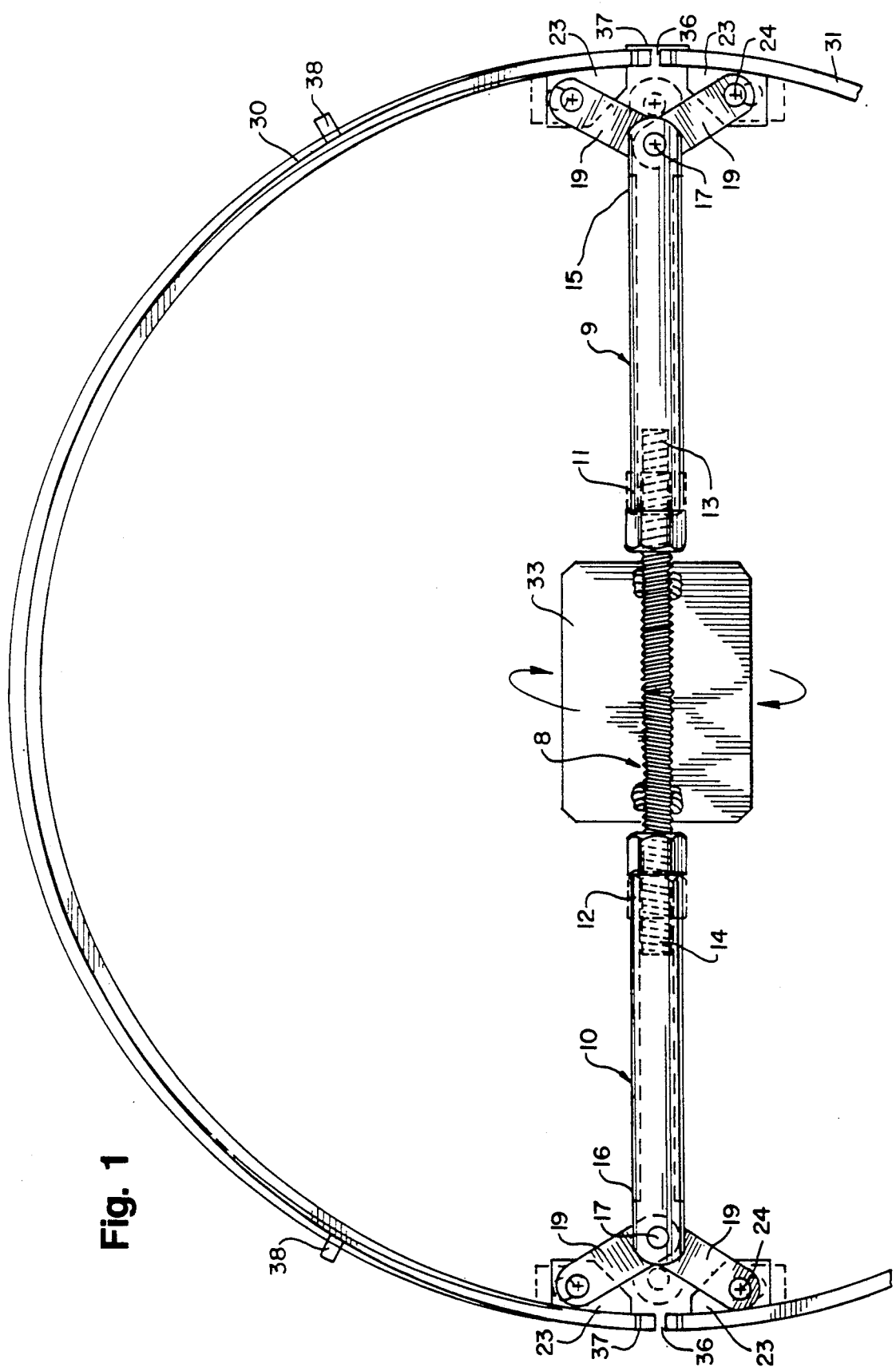
FIG. 1 is a plan cross-sectional view of the particularly preferred embodiment of the envelope sealing device of the present invention incorporating a turnbuckle sealing lever.

FIG. 1 shows the particularly preferred embodiment of the present invention, which incorporates a turnbuckle lever for fine tuning sealing adjustment. This particularly preferred embodiment includes two opposing semicircular flanges or half-rings, 30 and 31. The outer surface of these half-rings may be covered by a protective rubber outer coating, and the surface edges of the half-rings are preferably beveled, to ensure that no damage is done to the flexible curing envelope. Within the half-rings lies a centrally disposed threaded turnbuckle, designated as 8, and two threaded connecting members 9 and 10 which are both extensible and retractable.

The turnbuckle preferably includes a manually rotatable handle or grip 33. The threads of the connecting members lie in a different complementary position from the threads of the turnbuckle, to allow threadable mating. The proximal ends 11 and 12 of the connecting members are designed to threadably mate with the distal ends 13 and 14 of the turnbuckle. The threads of the connecting members extend a distance within the connecting member to allow the connecting members to extend and retract a sufficient distance, as shown in FIG. 1.

Still referring to FIG. 1, the distal ends 15 and 16 of connecting members 9 and 10 are pivotally connected at points 17 to two pairs of link members 19 Each of the distal ends of the link members are in turn pivotally connected at points 24 to two pairs of spacing members 23. Each of the spacing members are rigidly connected to the half-rings 30 and 31. A bead of weld is used to securely connect the spacing members to the half-rings.

The link members and the spacing members together form a toggle assembly. Thus, when the envelope sealing device is in its initial unexpanded position and an operator rotates the turnbuckle, the distal ends of the connecting members, 15 and 16, are extended in dramatically opposing directions, causing pivot points 17 to also move in outwardly normal and opposing directions along the longitudinal axes of the connecting members. Because of the slight angle which the link members make with the longitudinal axis of the connecting members, the equal and opposing forces which the toggle assembly exerts (via the spacing members) on the half-rings are directed in a predominately circumferential direction along the half-rings. Thus, the half-rings are caused to uniformly and simultaneously expand, while retaining their circular shape. The structure and connection of the link members and the spacing members with each of the half-rings and the connecting members is illustrated in FIGS. 3 and 4.

The points where the half-rings are joined, junctures 36, may simply consist of a space between half-rings 30 and 31. However, preferably, thin and curved bridging or guiding plates 37 are used to cover juncture 36. One end of each bridging plate 37 is rigidly connected or welded to one of the half-rings, while the other end of bridging plate 37 merely abuts the outer surface of the other half-ring 31; thus, as the half-rings are forced to expand, the end of the bridging plate 37 which is not rigidly connected to the half-ring frictionally slides over the outer edge of ring 30. Bridging plate 37 therefore serves to cover that portion of the expanding half-rings which would otherwise contact and possibly pinch or otherwise interfere with the envelope as it is pressed against the inner rim of the tire. Bridging plate 37 also provides a guidance function to ensure that the expanding portions of the half-rings do not deform and retain the circular shape of the half-rings. Additionally, after the half-rings of the present invention have been fully expanded, further rotation of the turnbuckle will cause a strictly normal secondary force to be directed on the half-rings by the spacing members. The application of this secondary force after the expansion phase serves an advantageous purpose: its application on the end of the half-ring which is only slidably and not rigidly connected to bridging plate 37 causes the end of the half-ring to abut each curved bridging plate 37 and thus align itself with the rest of the half-ring. Without this secondary force, it has been found that this portion of the half-ring would otherwise tend to deform slightly in a direction toward the center of the annular half-rings.

Referring again to FIG. 1, three radially extending stops 38 are shown. These stops 38 are located on the outer edge of the half-rings, are preferably curved at their ends to accommodate the tire rim, and are distributed in a uniform and spaced relationship. They serve to aid in the initial positioning of the annular portion (i.e., the half-rings) of the envelope sealing device within the rim of the tire to be retreaded. The envelope sealing device rests on these stops 38 when situated on the bead of a tire.

Referring still to FIG. 1, the two pairs of spacing members 23 serve an important purpose in the present invention. In their absence, if the pairs of link members 19 were directly and rigidly connected to half-rings 30 and 31, the force produced along the longitudinal axes of the arms would be directed in a more nearly normal and not radial direction. This would be the case because of the necessary geometry in such a structure: as the distal ends of the link members are moved away from the half-rings, the link members are more nearly parallel with a tangent of the half-ring, causing the forces generated to be substantially circumferential in direction. However, when normal forces acting on the spacing members (and thus the half-rings which they are rigidly connected to) predominate, the efficiency of the work done to expand the half-rings is decreased, as the work that is being done in the normal direction is (at least during the expansion phase) essentially useless. Even more importantly, while the juncture 36 would still expand in the absence of the spacing members, the expansion surface between the points on which the link members were fixed to the half-rings would have no curvature: the resulting ring configuration would therefore be "egg-shaped" and not circular.

In the particularly preferred embodiment of the present invention, the link members are oriented at an angle of approximately 65° from the diametrically extending adjusting means. This orientation provides that a force of 100 units will have a "substantially circumferentially directed force" of 65 units. Of course, the present invention also teaches that this angle may be increased, as the forces will then become predominantly more circumferentially (as opposed to radially) directed. Additionally, the present invention utilizes toggle means connected by spacing members 23 to the half-rings at four pivot points positioned in pairs and placed near the ends of each of the half-rings and within the half-rings. These four pivot points allow the efficient use of the substantially circumferentially directed forces generated by the adjusting means along the toggle means and link members to uniformly and simultaneously expand the half-rings. Moreover, with this positioning a relatively small diametrical extension of the adjusting means will convert into a relatively large displacement or expansion of the half-rings.

The envelope sealing device including the turnbuckle lever or adjusting means, shown in FIG. 1, is manufactured to fit the following tire rim sizes (diameter measured in inches): 20, 22, 22.5, 24 and 24.5. Of course, the invention is easily adaptable for fitting to a broad range of other tire rim diameters.

Figure 2:
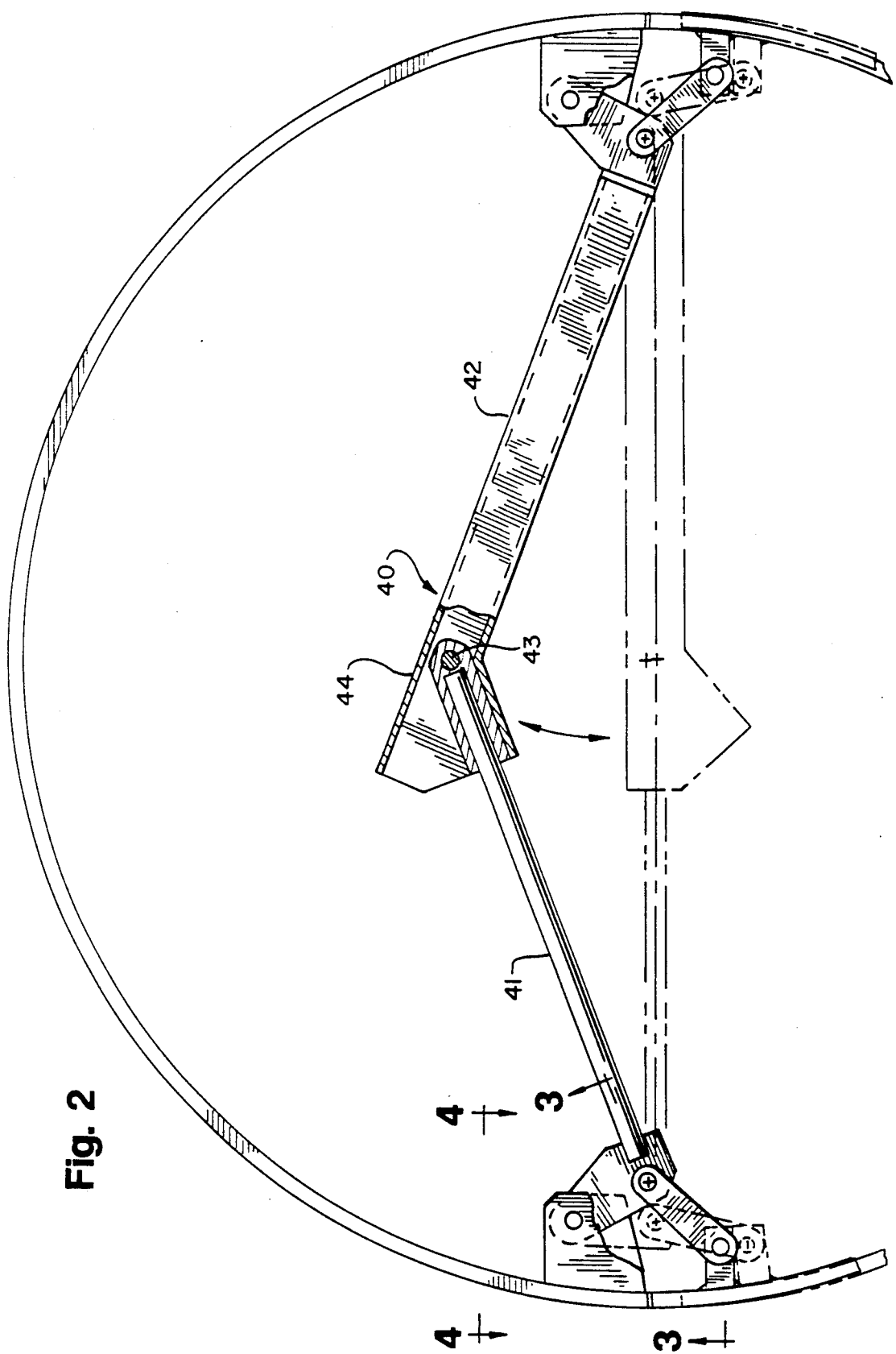
FIG. 2 is a plan view of a second embodiment of the envelope sealing device of the present invention incorporating a toggle-type sealing lever.

A second preferred embodiment of the envelope sealing device of the present invention, shown in FIG. 2, whose adjusting means incorporates a toggle means instead of a turnbuckle, will now be specifically described. The structure and operation of this embodiment is otherwise identical to the embodiment incorporating the turnbuckle adjusting means.

The diametrically extending toggle or sealing lever adjusting means, designated generally as 40, is shown in FIG. 2. Thus, a connecting member 41 and a connecting member 42 are pivotally connected at point 43. A manually actuated projection or grip 44 is positioned a distance beyond pivot point 43 along the longitudinal axis of connecting member 42. After positioning the device within the tire rim, the operator exerts a vertical force downward on grip 44, causing toggle lever 40 to align its connecting members 41 and 42 within a diametrical plane. At the same time, equal outwardly opposing and normally directed forces will be exerted on the link members, and the half-rings will be uniformly expanded by the spacing members while retaining their circular shape, as explained above.

Now referring to FIGS. 2 and 4, it can be seen that each of the spacing member 23 can consist of either one member, or a pair of opposing members, as shown in FIG. 4.

While attachments such as cotter pins can be used for connected the link members to the spacing members, it is preferred to use attachments which are smooth and thus will not tear the curing envelope. Such attachments may include pressure rings or pressure caps, which fit over a narrowed channel portion of a connecting pin.

Of course, it should be understood that various changes and modifications to the preferred embodiments described herein will be apparent to those skilled in the art. Such modifications and changes can be made to the illustrated embodiments without departing from the spirit and scope of the present invention, and without diminishing the attendant advantages. It is, therefore, intended that such changes and modifications be covered by the following claims.

What is claim is:

1. An expandable annular envelope sealing device for securing a flexible envelope to the bead of a tire to be retreaded in an autoclave, comprising:
    two opposed semicircular half-rings;
    toggle means connected to each semicircular half-ring for expanding said half-rings; and
    diametrically extending adjusting means to actuate said toggle means.

2. The envelope sealing device of claim 1, wherein said toggle means is adapted to transmit a predominantly circumferentially directed force at a plurality of spaced locations proximate the ends of each of the half-rings.

3. The envelope sealing device of claim 1, further comprising:
    a pair of arcuate bridging plates which extend substantially across the entire width of said half-rings, each of said bridging plates being rigidly connected to a diametrically opposed end of said half-rings.

4. The envelope sealing device of claim 1, further comprising a plurality of radially extending stops mounted to said half-rings for properly positioning said half-rings relative to the bead of the tire.

5. The envelope sealing device of claim 1, further comprising two pairs of spacing members extending in a radially inward direction from each of the ends of the half-rings, the proximal ends of said spacing members being rigidly connected to said half-rings, and the distal ends of said spacing members being pivotally connected to said toggle means.

6. An expandable annular envelope sealing device for securing a flexible envelope to the bead of a tire to be retreaded in an autoclave, comprising:
    two opposed semicircular half-rings;
    toggle means connected to both ends of each semicircular half-ring for expanding said half-rings, said toggle means including pivotally connected link members;
    diametrically extending adjusting means to actuate said toggle means, said adjusting means including an intermediate threaded turnbuckle and extensible and retractable threaded connecting members, the proximal ends of said threaded connecting members mating with said threaded turnbuckle, and the distal ends of said threaded connecting members cooperating with the link members of said toggle means; and
    said adjusting means being manually actuable and said toggle means being adapted to transmit substantially circumferentially directed forces at a plurality of spaced locations proximate the ends of each of the half-rings.

7. The envelope sealing device of claim 6, wherein said toggle means are adapted to transmit said forces in a substantially circumferential direction along the half-rings.

8. The envelope sealing device of claim 6, wherein said link members are rigidly connected to said half-rings at points spaced from said half-rings.

9. The envelope sealing device of claim 6, wherein said link members have a maximum length of three inches.

10. The envelope sealing device of claim 6, further comprising a pair of arcuate bridging plates which extend substantially across the entire width of said half-rings, each of said bridging plates being rigidly connected to diametrically opposed ends of said half-rings.

11. The envelope sealing device of claim 6, further comprising a plurality of radially extending stops mounted to said half-rings for properly positioning said half-rings relative to the bead of the tire.

12. The envelope sealing device of claim 6, wherein said turnbuckle includes a force transmitting handle.

13. The envelope sealing device of claim 6, further comprising two pairs of spacing members extending in a radially inward direction from each of the ends of the half-rings, the proximal ends of said spacing members being rigidly connected to said half-rings, and the distal ends of said spacing members being pivotally connected to said link members.

14. An expandable annular envelope sealing device for securing a flexible envelope to the rim of a tire to be retreaded in an autoclave, comprising:
   two opposed semicircular half-rings;
   first toggle means connected to both ends of each semicircular half-ring for expanding said half-rings, said first toggle means including pivotally connected; and
   a diametrically extending second toggle means, said second toggle means having a proximal end, and diametrically opposed distal ends which cooperate with said link members for actuating said first toggle means; and
   said second toggle means being manually actuable and said first toggle means being adapted to transmit substantially circumferentially directed forces at a plurality of spaced locations proximate the ends of each of the half-rings.

15. The envelope sealing device of claim 14, wherein said first toggle means is adapted to transmit said forces in a substantially circumferential direction along the half-rings.

16. The envelope sealing device of claim 14, wherein said link members are rigidly connected to said half-rings at points spaced from said half-rings.

17. The envelope sealing device of claim 14, wherein said link members have a maximum length of three inches.

18. The envelope sealing device of claim 14, further comprising a pair of arcuate bridging plates which extend substantially across the entire width of said half-rings, each of said bridging plates being rigidly connected to diametrically opposed ends of said half-rings.

19. The envelope sealing device of claim 14, further comprising a plurality of radially extending stops mounted to said half-rings for properly positioning said half-rings relative to the bead of the tire.

20. The envelope sealing device of claim 14, wherein the proximal end of said first toggle means includes a force transmitting handle.

21. The envelope sealing device of claim 14, further comprising two pairs of spacing members extending in a radially inward direction from each of the ends of the half-rings, the proximal ends of said spacing members being rigidly connected to said half-rings, and the distal ends of said spacing members being pivotally connected to said link members.

* * * * *